No. 644,846. Patented Mar. 6, 1900.
D. COLLEN.
SIGNAL APPARATUS FOR RAILWAYS.
(Application filed Aug. 31, 1899.)
(No Model.) 2 Sheets—Sheet 2.
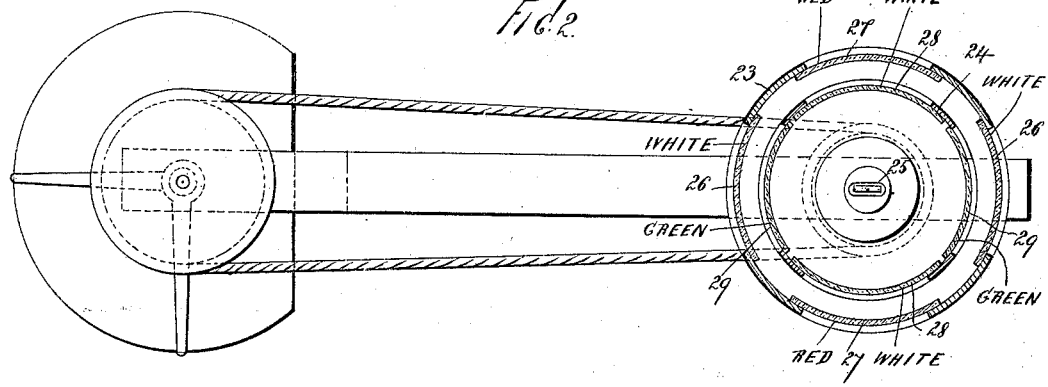
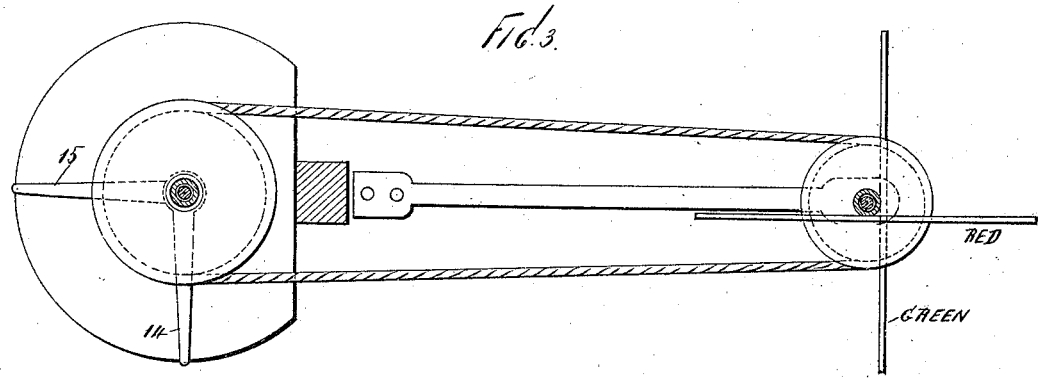
WITNESSES
INVENTOR
Daniel Collen,
BY
Edgar Tate & Co.
ATTORNEYS.

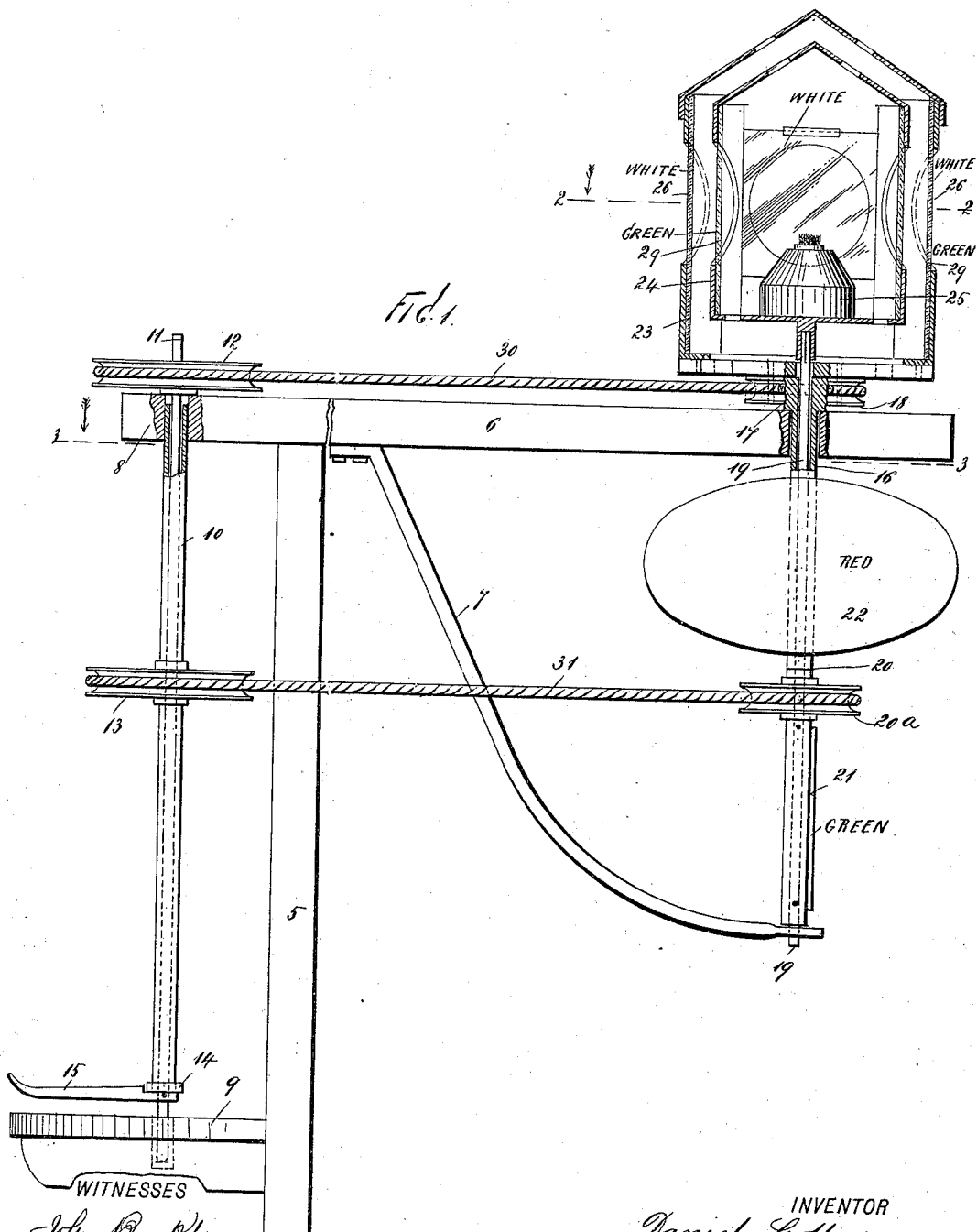

UNITED STATES PATENT OFFICE.

DANIEL COLLEN, OF INWOOD, CANADA.

SIGNAL APPARATUS FOR RAILWAYS.

SPECIFICATION forming part of Letters Patent No. 644,846, dated March 6, 1900.

Application filed August 31, 1899. Serial No. 729,144. (No model.)

*To all whom it may concern:*

Be it known that I, DANIEL COLLEN, a subject of the Queen of Great Britain, residing at Inwood, Province of Ontario, Dominion of Canada, have invented certain new and useful Improvements in Signal Apparatus for Railways, of which the following is a full and complete specification, such as will enable those skilled in the art to which it appertains to make and use the same.

This invention relates to railway signal apparatus; and the object thereof is to provide an improved apparatus of this class which is located at a station and may be operated by the station agent for the purpose of signaling trains, stopping the same when desired, and for other and similar purposes.

The invention is fully disclosed in the following specification, of which the accompanying drawings form a part, in which—

Figure 1 is a sectional side elevation of the apparatus I employ; Fig. 2, a section on the line 2 2 of Fig. 1, and Fig. 3 a section on the line 3 3.

In the drawings forming part of this specification the separate parts of my improvement are designated by numerals of reference in each of the views, and in the practice of my invention as shown in the drawings I provide a standard or other support 5, the upper end of which is provided with a horizontal arm 6, to which is secured a downwardly and outwardly curved supplemental arm 7. The arm 6 projects backwardly to form an extension 8, and connected with the standard or support 5, near the bottom thereof, is a bracket 9, and mounted in the extension 8 of the arm 7 is a vertically-arranged tubular shaft 10, which projects upwardly through the extension 8 of the arm 6 and terminates just above the bracket 9, and passing through the tubular shaft 10, which is free to turn in the extension 8 of the arm 6 and projecting above said extension, is an inner shaft 11, which has a bearing in the bracket 9. Mounted on the upper end of the inner supplemental shaft 11 is a pulley 12, and the tubular shaft 10 is provided with a similar pulley 13. The lower end of the tubular shaft 10 is also provided with an arm 14, and the inner or supplemental shaft 11 just above the bracket 9 is provided with a similar arm 15, which is secured thereto, and the said tubular shaft 10 rests on the head of the arm 15.

Mounted in the outer end of the arm 6 is a tubular shaft 16, which projects upwardly through said arm and is provided with a head 17, to which is secured a pulley 18, and passing centrally through the tubular shaft 16 is a supplemental shaft 19, the lower end of which has a bearing in the arm 7, and the tubular shaft 16 rests on the arm 7.

The tubular shaft 16 is divided centrally, as shown at 20, and the lower section thereof is secured to the shaft 19 and provided with a pulley 20ª, which is secured thereto, and also with a green signal-board 21, while the upper section of said tubular shaft 16 is free to turn on the shaft 19 and is provided with a red signal-board 22.

A signal or semaphore casing 23 is connected with the upper end of the shaft 16 and with the pulley 18, and said casing is preferably cylindrical in form, and the upper end of the shaft 19 passes upwardly through the bottom of said casing, and connected therewith is an inner or supplemental signal or semaphore casing 24, within which is placed a lamp 25.

The signal or semaphore casings 23 and 24 may be connected, respectively, with the tubular shaft 16 and the shaft 19 in any desired manner; but these connections should be detachable in order that said casings may be detached from said shafts whenever desired.

The outer signal or semaphore casing 23 is provided in its diametrically-opposite sides with white glasses 26 and at right angles thereto and in the opposite sides with red signal-glasses 27, and the inner casing 24 is provided in its diametrically-opposite sides with white glasses 28 and at right angles thereto and in the opposite sides with green glasses 29.

The pulley 12 on the upper end of the inner supplemental shaft 11 and the pulley-wheel 18 on the upper end of the tubular shaft 16 are connected by a cable 30, and the pulley 13 on the tubular shaft 10 and the pulley 20, which is secured to the shaft 19, are connected by a cable 31, and by operating the arm 15 on the lower end of the shaft 11 the said shaft, the pulley 12, secured thereto, and the pulley 18, the tubular shaft 16, to which said pulley is secured, and the signal or semaphore casing 23 may be turned, as will be readily understood, while the other parts of the apparatus will remain stationary, and by operating the arm 14, which is secured to the lower end of the tubular shaft 10, said shaft, the pulley 13, the pulley 20ª, the shaft 19, mounted in the tubular shaft 16, and the inner signal or semaphore casing 24 may be turned, while the remaining parts remain stationary.

When the red signal-board 22 on the shaft 16 is in the position shown in Fig. 1, the signal-light in the inner casing 24 will show red, as indicated in Fig. 2, the red glasses in the casing 23 being in position to cover the white glasses in the inner casing 24. This is the position the signal devices occupy when it is desired to stop a train, and it will be apparent that the position of the red and green boards may be reversed, which operation will also change the position of the casings 23 and 24, which will show a green light. The apparatus is thus adapted for both day and night use, red and green boards being particularly adapted for use in the daytime and the red and green lights at night, and either a red or green light may be shown by operating the arms 14 and 15, and it will be understood that whenever a red or a green light is shown a corresponding red or green board is also shown.

As hereinbefore stated, the casings 23 and 24 in which the lamp is placed, may be connected with their supports in any desired manner, and the lamp 25 may also be secured in position in any desired manner, and all of said parts are made detachable for the purpose of cleaning and repairing and for filling the lamp.

Having fully described my invention, I claim as new and desire to secure by Letters Patent—

1. A railway signal apparatus of the class described, comprising, a suitable support, a tubular shaft mounted therein, a signal-board connected with said shaft, a supplemental shaft passing upwardly through said tubular shaft, a signal-board connected with said supplemental shaft, an outer signal-casing connected with the upper end of the tubular shaft, through the bottom of which the upper end of the supplemental shaft passes, another signal-casing within the outer signal-casing and mounted on the end of the supplemental shaft, a lamp within said inner signal-casing, and means for operating said shafts, substantially as shown and described.

2. A railway signal apparatus of the class described, comprising a suitable support, a tubular shaft mounted therein, a signal-board connected with said shaft, a supplemental shaft passing upwardly through said tubular shaft, a signal-board connected with said supplemental shaft, an outer signal-casing connected with the upper end of the tubular shaft, through the bottom of which the upper end of the supplemental shaft passes, another signal-casing within the outer signal-casing and mounted on the end of the supplemental shaft, a lamp within said inner signal-casing, and means for operating said shafts, comprising another tubular shaft geared in connection with said supplemental shaft, a shaft mounted in said last-named tubular shaft and geared in connection with said first-named tubular shaft, and arms connected with the last-named tubular shaft and the shaft mounted therein, substantially as shown and described.

3. A railway signal apparatus, comprising a suitable support, a vertically-arranged tubular shaft mounted therein and projecting upwardly therethrough, a signal-casing connected with the upper end of said tubular shaft, a supplemental shaft passing upwardly through said tubular shaft and into said casing, an inner signal-casing mounted on said last-named shaft within said first-named casing, a lamp in said inner casing, said tubular shaft and the shaft mounted therein being each provided with a signal-board of different colors, and means for turning said shafts and the parts connected therewith, substantially as shown and described.

In testimony that I claim the foregoing as my invention I have signed my name, in presence of the subscribing witnesses, this 24th day of August, 1899.

DANIEL COLLEN.

Witnesses:
  J. W. HODGINS,
  W. A. GRAHAM.